US011255959B2

(12) United States Patent
Becker

(10) Patent No.: US 11,255,959 B2
(45) Date of Patent: Feb. 22, 2022

(54) APPARATUS, METHOD AND COMPUTER PROGRAM FOR COMPUTER VISION

(71) Applicant: Sony Corporation, Tokyo (JP)

(72) Inventor: Florian Becker, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 139 days.

(21) Appl. No.: 16/610,911

(22) PCT Filed: May 30, 2018

(86) PCT No.: PCT/EP2018/064246
§ 371 (c)(1),
(2) Date: Nov. 5, 2019

(87) PCT Pub. No.: WO2018/220048
PCT Pub. Date: Dec. 6, 2018

(65) Prior Publication Data
US 2020/0158856 A1 May 21, 2020

(30) Foreign Application Priority Data
Jun. 2, 2017 (EP) .................................... 17174267

(51) Int. Cl.
| *G01S 13/86* | (2006.01) |
| *G01S 13/933* | (2020.01) |
| *G01S 13/50* | (2006.01) |
| *G01S 13/58* | (2006.01) |
| *G01S 13/931* | (2020.01) |
| *G01S 13/00* | (2006.01) |

(52) U.S. Cl.
CPC .......... *G01S 13/867* (2013.01); *G01S 13/505* (2013.01); *G01S 13/585* (2013.01); *G01S 13/931* (2013.01); *G01S 13/933* (2020.01)

(58) Field of Classification Search
None
See application file for complete search history.

(56) References Cited

U.S. PATENT DOCUMENTS

| 5,414,643 | A | * | 5/1995 | Blackman | ............. | G01S 13/726 |
| | | | | | | 342/95 |
| 5,677,836 | A | * | 10/1997 | Bauer | ..................... | G01S 13/89 |
| | | | | | | 701/23 |
| 6,414,712 | B1 | * | 7/2002 | Wanielik | ............... | G01S 13/867 |
| | | | | | | 348/118 |
| 8,049,658 | B1 | | 11/2011 | Lagonik et al. | | |
| 9,215,382 | B1 | * | 12/2015 | Hilde | ..................... | G01S 17/89 |
| 10,094,855 | B1 | * | 10/2018 | Fuhr | ..................... | G01S 19/53 |
| 2007/0219720 | A1 | * | 9/2007 | Trepagnier | ............ | G01S 17/931 |
| | | | | | | 701/300 |

(Continued)

FOREIGN PATENT DOCUMENTS

| EP | 2799902 | A1 | 11/2014 | | |
| WO | WO2015/185846 | A1 | * | 12/2015 | ............. G01S 17/87 |

OTHER PUBLICATIONS

International Search Report and Written Opinion dated Aug. 28, 2018 for PCT/EP2018/064246 filed on May 30, 2018, 9 pages.

*Primary Examiner* — Bernarr E Gregory
(74) *Attorney, Agent, or Firm* — Xsensus LLP

(57) ABSTRACT

An apparatus comprising circuitry configured to transfer motion information obtained from a plurality of sensors of different or similar type to a common representation.

18 Claims, 10 Drawing Sheets

(56) References Cited

U.S. PATENT DOCUMENTS

| | | |
|---|---|---|
| 2009/0195410 A1* | 8/2009 | Takemura .......... G06K 9/00805 |
| | | 340/904 |
| 2014/0136414 A1 | 5/2014 | Abhyanker |
| 2014/0195138 A1 | 7/2014 | Stelzig et al. |
| 2016/0291149 A1 | 10/2016 | Zeng et al. |
| 2016/0314097 A1* | 10/2016 | Bradford ................. G01S 13/86 |
| 2017/0097411 A1 | 4/2017 | Levi et al. |
| 2017/0109644 A1 | 4/2017 | Nariyambut et al. |
| 2017/0254896 A1* | 9/2017 | Yamamoto ............ G01S 13/867 |

* cited by examiner

APPARATUS, METHOD AND COMPUTER PROGRAM FOR COMPUTER VISION

CROSS-REFERENCE TO RELATED APPLICATIONS

The present application is based on PCT filing PCT/EP2018/064246, filed May 30, 2018, which claims priority to EP 17174267.9, filed Jun. 2, 2017, the entire contents of each are incorporated herein by reference.

TECHNICAL FIELD

The present disclosure generally pertains to the field of computer vision, in particular to camera and radar-based measurement systems. Such technology can for example be used in applications for automotive driving.

TECHNICAL BACKGROUND

In autonomous driving and in the field of advanced driver assistance systems the surrounding scenery is typically described as a small number of unextended contacts, each being described by a state with at least 2d position and 2d velocity that represents motion.

In designing autonomous cars, a number of sensors such as cameras, radar and LiDAR are used to provide the information necessary for self-driving without direct contact. For example, modern self-driving cars rely on techniques such as stereo cameras, Doppler radar and/or LiDAR (Light Detection and Ranging) to estimate motion.

Stereo cameras provide high resolution information and they can see color which makes them very efficient in the classification of objects and texture interpretation. Stereo cameras can also be efficiently used for motion estimation. Estimating the dense non-rigid three-dimensional motion field of a scene is known as scene flow estimation. Scene flow estimation (in short "scene flow") shows the three-dimensional displacement vector of each surface point between two frames. However, scene flow estimation typically provides motion information with less accuracy in the radial direction than in the angular direction.

Doppler radar is a sensor system that uses radio waves to determine the velocity, range and angle of objects. The radar technology is very efficient in motion measurement. Radar velocity measurements provide good accuracy in the radial direction but less or even no accuracy in the angular direction.

Camera and radar based measurement systems thus provide information on motion in an environment with complementary precision and in very different data representations.

There are already existing technologies and methods for motion measuring of distant objects without direct contact, but all of them suffer uncertainties and they lack comparability between each other.

SUMMARY

According to a first aspect, the disclosure provides an apparatus comprising circuitry configured to transfer motion information obtained from a plurality of sensors of different or similar type to a common representation.

According to a further aspect, the disclosure provides a method comprising transferring motion information obtained from a plurality of sensors of different or similar type to a common representation.

According to a yet further aspect the disclosure provides a computer program comprising instructions which, when carried out on a processor, cause the processor to transfer motion information obtained from a plurality of sensors of different or similar type to a common representation.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
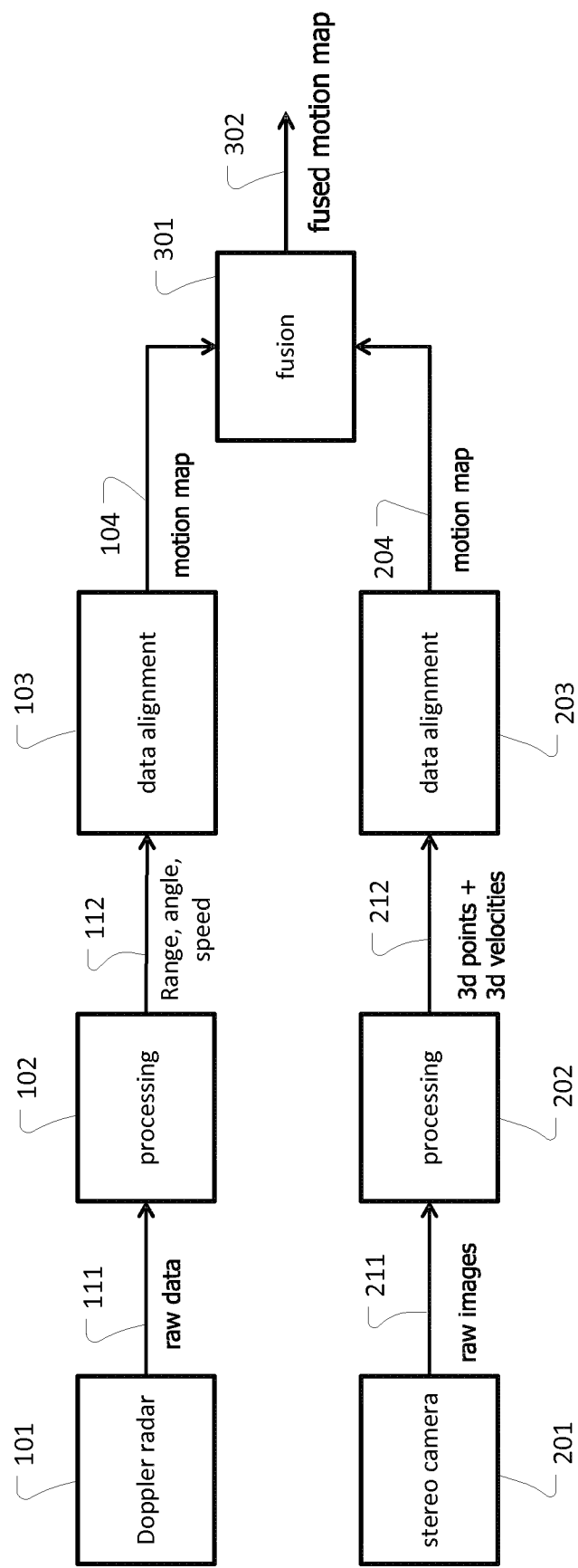
FIG. 1 schematically describes the generation of a fused motion map by fusing data of a Doppler radar and data obtained from scene flow estimation based on images of a stereo camera.

Before a detailed description of the embodiments under reference of FIG. 1, some general explanations are made.

The embodiments described below disclose an apparatus comprising circuitry configured to transfer motion information obtained from a plurality of sensors of different or similar type to a common representation. The plurality of sensors may be of different type or of similar type.

The apparatus may for example comprise an integrated control unit that controls general operation within a vehicle control system in accordance with various kinds of programs. An integrated control unit may include a microcomputer, a general-purpose communication I/F, a dedicated communication, a positioning section, a beacon receiving section, an in-vehicle device, a sound/image output section, a vehicle-mounted network I/F, a storage section, or the like.

The apparatus may for example be used in a vehicle control system, in an advanced driver assistance system, in a controller for autonomous driving, or the like. For example, the apparatus may be applied as a vehicle control system or advanced driver assistance system in motor vehicle such a car, a motor cycle, a truck, or the like. Alternatively, the apparatus may also be applied as a vehicle control system or advanced driver assistance system in an electric vehicle or in a hybrid vehicle. The apparatus may also be applied in other scenarios, e.g. as controller for autonomous robots or drone products, or, in general, for any movable apparatus. In particular, in the case that the disclosed technology is applied to automotive systems, the obtained increase in the accuracy of the position and velocity information in measurements of objects is highly required.

Circuitry may include a processor, a memory (RAM, ROM or the like), a storage, input means (mouse, keyboard, camera, etc.), output means (display (e.g. liquid crystal, (organic) light emitting diode, etc.), loudspeakers, etc., a (wireless) interface, etc.), as it is generally known for electronic devices (computers, smartphones, etc.). Moreover, it may include sensors for sensing still image or video image data (image sensor, camera sensor, video sensor, etc.), for sensing a fingerprint, for sensing environmental parameters (e.g. radar, humidity, light, temperature), etc.

Sensors of different types may for example be of anyone of the following types: a stereo camera, an ultrasonic sensor, a radar device, or a LiDAR device (Light detection and Ranging device, or Laser imaging detection and ranging device).

The circuitry may also be configured to transfer motion information obtained from a plurality of sensors of similar type to a common representation. For example, the circuitry may be configured to fuse information from several cameras or radars of similar type complementing each other, e.g. due to different viewing angles.

The common representation to which motion information obtained from the plurality of sensors is transferred may for example be a motion map. A motion map may also be seen as a "dynamic occupancy map". A motion map may for example be a 2d data array that represents data in the "bird's eye perspective". A motion map may for example be a 2d grid representation of motion data. A grid representation of a motion map may be based on a regular or irregular grid, i.e. the cells do not necessarily have to be square, but can also change their size, shape etc. In the embodiments, the cells of the grid cover the whole map domain. A motion map may for example store velocity data in dependence of generic x, z coordinates.

Data association may be given by the assignment of data to cells of the motion map. Each cell may be defined by a specific x, z coordinate pair.

The circuitry may be configured to fuse the data of a Doppler radar and a stereo camera into a common representation. The apparatus may however not only be applied for the combination of Doppler radar and scene flow (stereo camera), but also for a ultrasound or LiDAR sensor and stereo camera, or other combinations, if they can be configured to provide motion information for the environment.

The circuitry may be configured to transfer to the common representation motion information obtained from a Doppler radar.

Motion information obtained from the Doppler radar may comprise polar coordinates of a cell in the polar coordinate space and angular and radial components of the velocity attributed to the cell.

The circuitry may be configured to transfer to the common representation motion information obtained by scene flow estimation on images captured by a stereo camera.

Motion information obtained from scene flow estimation may comprise image positions, disparity data and displacement data.

The circuitry may be configured to reconstruct position and velocity from sensor data to obtain a motion map of the sensor data.

The circuitry may be configured to apply an error model for motion on the processed data to obtain a motion map of the sensor data. An error model may for example determine mean and covariance of sensor measurements.

The circuitry may for example be configured to represent the motion map by $\mu_{v_x,v_z}$, $\Sigma_{v_x,v_z}$; x, z where x, z are 2d Cartesian coordinates in the motion map, $\mu_{v_x,v_z}$ are the mean values of a normal distribution describing a velocity estimate $(v_x, v_z)$, and $\Sigma_{v_x,v_z}$ is the covariance matrix that represents the uncertainty of the motion measurement obtained from a sensor-specific error model.

The circuitry may be configured to fuse sensor data cell-wise by determining for each cell a joint probability for the velocity.

The circuitry may be configured to assume, for every grid cell of a motion map, that the velocity v of contacts in this cell follows a normal distribution.

The circuitry may be configured to transform parameters of an error model into an auxiliary representation. This auxiliary representation may for example be used in implementations to speed up or otherwise simplify the processing.

In general, the circuitry may be configured to fuse information from sensors "a" and "b" given velocity distributions in the same cell. Sensors "a" and "b" may be of any one of the sensor types described above or in the embodiments described below in more detail. This can be extended to any finite number of sensors of any kind that provide motion information that can be converted to a motion map.

The embodiments also disclose a method comprising transferring motion information obtained from a plurality of sensors to a common representation. The method may comprise anyone of the processing steps described above or in the embodiments described below in more detail.

The embodiments also disclose a computer program comprising instructions which when, carried out on a processor, cause the processor to transfer motion information obtained from a plurality of sensors to a common representation. The computer program may comprise instructions to perform any one of the processing steps described above or in the embodiments described below in more detail.

The embodiments also disclose a tangible computer-readable medium that stores a computer program comprising instructions which, when carried out on a processor, cause the processor to transfer motion information obtained from a plurality of sensors to a common representation. The tangible computer-readable medium may store a computer program comprising instructions to perform anyone of the processing steps described above or in the embodiments described below in more detail.

The embodiments are now described in more detail with reference to the accompanying drawings.

FIG. 1 schematically describes the generation of a fused motion map by fusing data of a Doppler radar and data obtained from scene flow estimation based on images of a stereo camera. At 101, a Doppler radar generates raw data 111. At 102, the raw data is processed to produce processed data 112 such as range, angle and speed data by calibration, FFT, beam-forming, etc. The processed data 112 may for example be a two-dimensional array in polar coordinates r, φ, or a three-dimensional array with axes related to polar position coordinates r and φ as well as radial velocity $v_r$. At 103, the processed data 112 is aligned to a motion map 113. This alignment transfers the motion information contained in the processed data to a common representation. At 201, a stereo camera produces raw images 211. At 202, the raw images 211 are processed by calibration, stereo & motion estimation (scene flow estimation), etc. whereby processed data 212 in the form of 3d points and 3d velocities are produced. At 203, the processed data 212 are aligned to generate a motion map 204. This alignment transfers the motion information obtained from camera images to a common representation. Both motion maps 104 and 204 are fused in 301 to create a fused motion map 302 in which both data are combined. Data association is given by the assignment of data to cells of the motion map during data alignment in 103 and 203.

Figure 2:
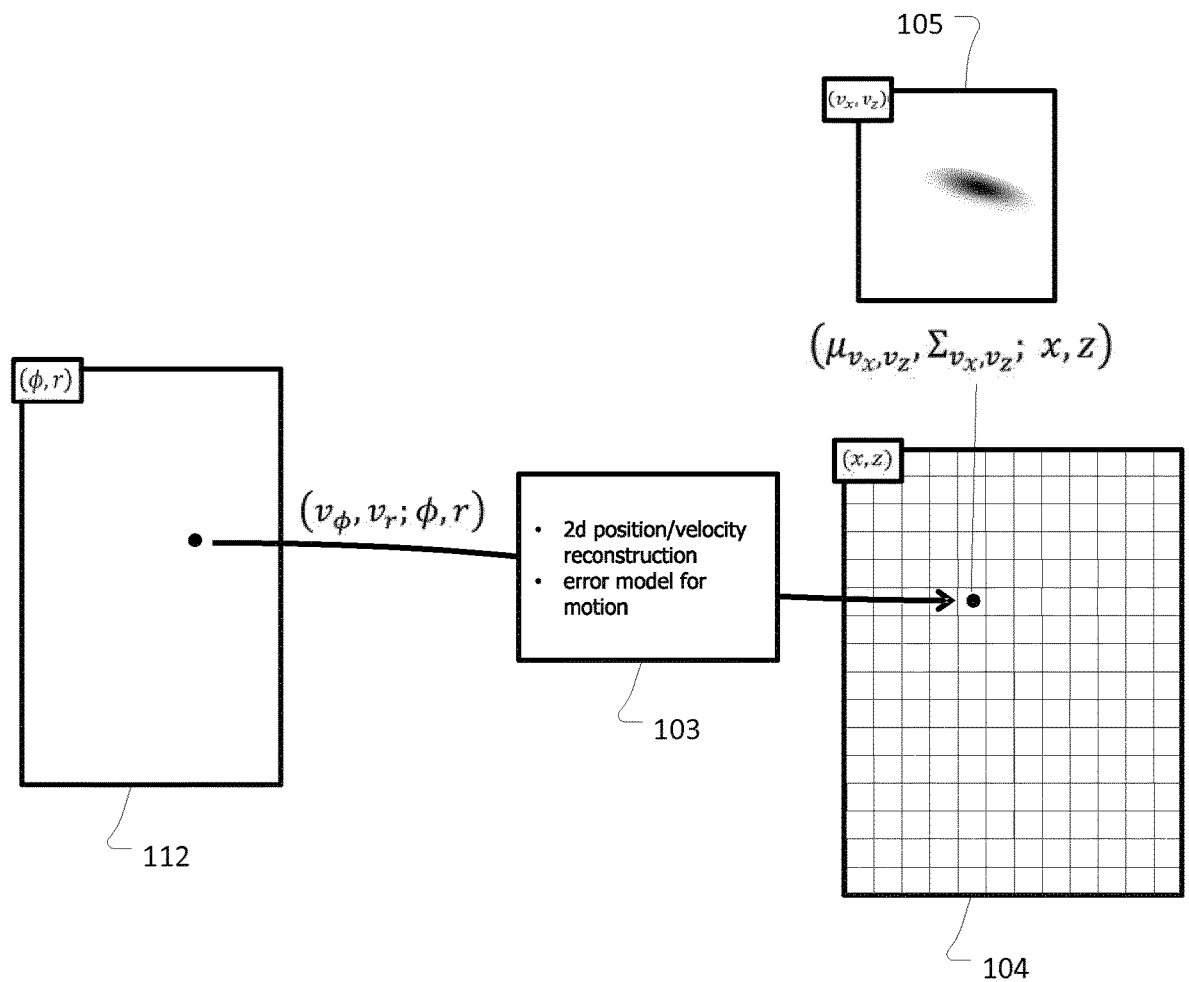
FIG. 2 shows in more detail the alignment of the processed data from the Doppler radar in order to generate a motion map.

FIG. 2 shows in more detail the alignment 103 of the processed data 112 from the Doppler radar in order to generate motion map 104. The processed data 112 is represented as $(v_φ, v_r; φ, r)$, where φ, r denote the polar coordinates of a cell in the polar coordinate space (φ, r) and $v_φ$, $v_r$ are the angular and radial component of the velocity attributed to the cell. As state-of-the-art radars do not provide information on $v_φ$, the $v_φ$ component can be modelled to be zero and to have an infinite uncertainty. Alternatively, for Doppler radar, $v_φ$ could also be removed from the model. In the alignment process 103 a position/velocity reconstruction and an error model for motion is applied to the processed data 112 to obtain the motion map 104. The motion map space is represented by spatial coordinates (x, z). Data in the motion map is represented by $(\mu_{v_x,v_z}, \Sigma_{v_x,v_z}; x, z)$ where x, z are 2d Cartesian coordinates in the motion map, $\mu_{v_x,v_z}$ are the mean values of a normal distribution describing a velocity estimate $(v_x, v_z)$, and $\Sigma_{v_x,v_z}$ is the respective covariance matrix that represents the uncertainty of the motion measurement obtained from a sensor-specific error model. As represented by 105 in FIG. 2, with a Doppler radar, the error $\mu_{v_x,v_z}$ in the radial direction of the velocity space $(v_x, v_z)$ is smaller than the error $\Sigma_{v_x,v_z}$ in the angular direction of the velocity space $(v_x, v_z)$.

Figure 3:
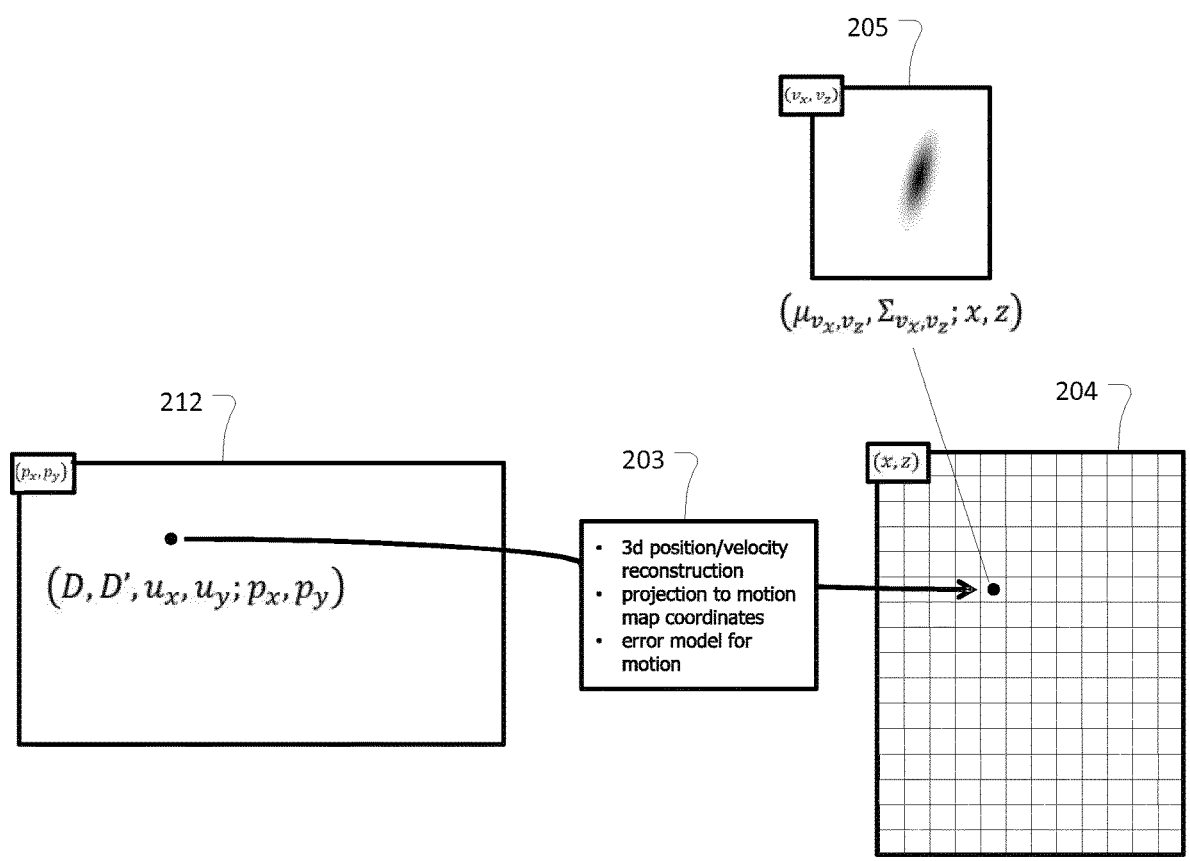
FIG. 3 shows in more detail the alignment of the processed data from the stereo camera in order to generate a motion map.

FIG. 3 shows in more detail the alignment 203 of the processed data 212 from the stereo camera in order to generate motion map 204. The processed data 212 is represented as $(D, D', \mu_x, \mu_y; p_x, p_y)$ where $p_x$, $p_y$ are image positions (pixel coordinates) in the image space $(p_x, p_y)$, and D represents disparity data at a first point in time, D' represents disparity data at a second point in time, and $\mu_x$, $\mu_y$ represents the displacement of a point in a camera view (e.g. left camera). In the alignment process 203 a 3d position/velocity reconstruction, a projection to motion map coordinates, and an error model for motion is applied to the processed data 212 to obtain the motion map 204. The motion map space is represented by spatial coordinates (x, z). Again, data in the motion map is represented by $(\mu_{v_x,v_z}, \Sigma_{v_x,v_z}; x, z)$ where x, z are 2d Cartesian coordinates in the motion map, $\mu_{v_x,v_z}$ are the mean values of a normal distribution describing a velocity estimate $(v_x, v_z)$, and $\Sigma_{v_x,v_z}$ is the covariance matrix that represents the uncertainty of the motion measurement obtained from a sensor-specific error model. As represented by 205 in FIG. 3, with a stereo camera, the uncertainty of the velocity is typically smaller in the angular direction compared to the radial direction in the velocity space.

Figure 4:
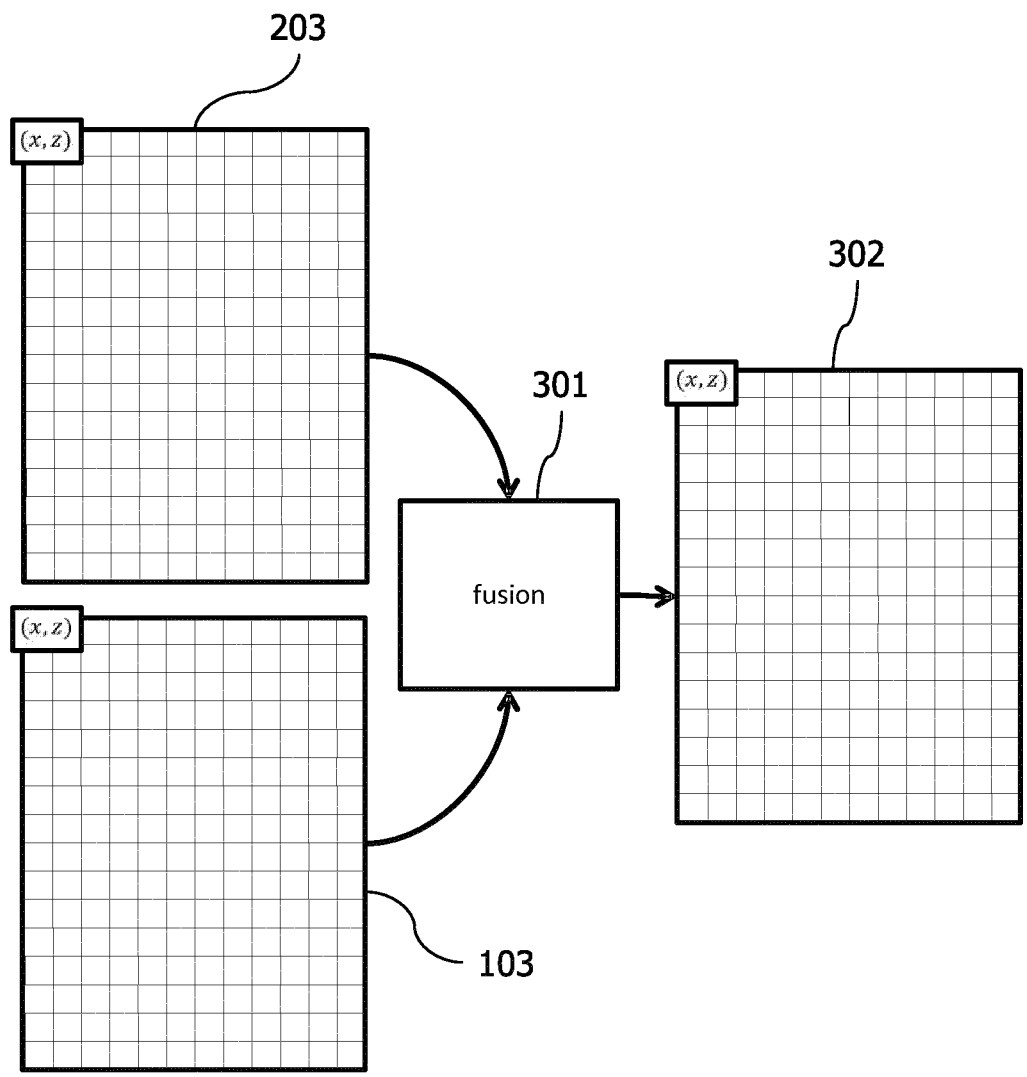
FIG. 4 shows in more detail the process of fusing the motion map obtained from data of a Doppler radar and the motion map obtained from data of a stereo camera in order to obtain a fused motion map.

FIG. 4 shows in more detail the process 301 of fusing the motion map 104 obtained from data of a Doppler radar and the motion map 204 obtained from data of a scene flow analysis of stereo camera images in order to obtain a fused motion map 302. According to this example, the motion map 104 is a 2d grid representation in spatial coordinates (x, z) of the processed data 212 after alignment and the motion map 204 is a 2d grid representation in spatial coordinates (x, z) of the processed data 212 after alignment. Fusion 301 merges the information cell-wise by determining for each cell a joint probability for the velocity $(v_x, v_z)$. The fused motion map 302 is, again, a 2d grid representation in spatial coordinates (x, z).

Figure 5C:
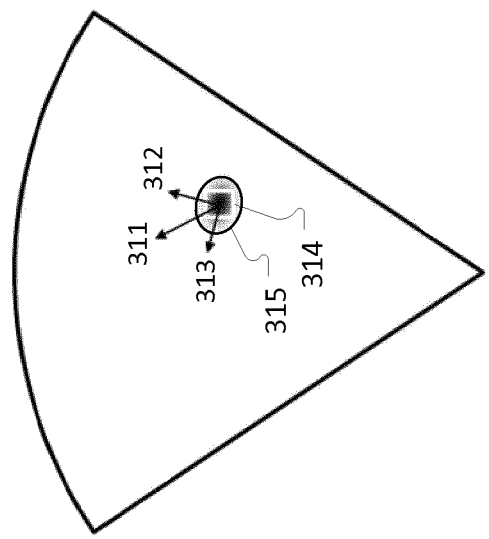
FIG. 5c shows the reduced velocity measurement uncertainty in a fused motion map generated by fusing the aligned data of a Doppler radar and a stereo camera.
Figure 5B:
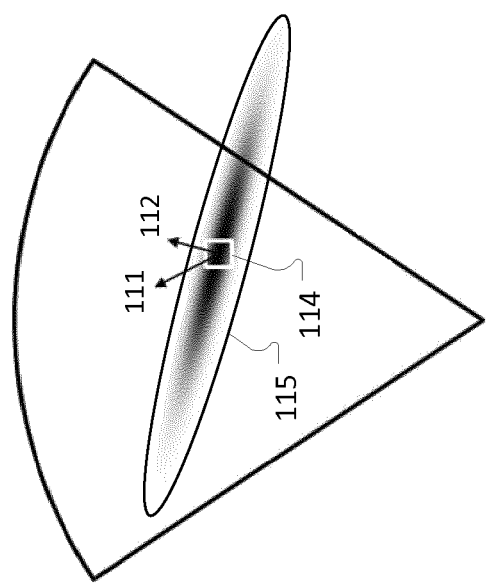
FIG. 5b schematically shows the uncertainty of a single velocity measurement as seen by a Doppler radar.
Figure 5A:
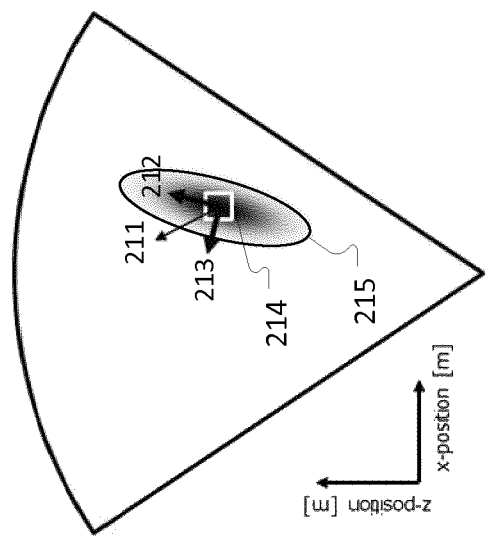
FIG. 5a schematically shows the uncertainty of a single velocity measurement as seen by a scene flow analysis (stereo camera)

FIG. 5a schematically shows the uncertainty of a single velocity measurement as seen by a scene flow analysis (stereo camera). The figure shows the spatial resolution uncertainty of the observed velocity of the stereo camera in the associated motion map. The motion map stores in cell 214 the 2d mean value and the uncertainty of the z velocity vector, indicated by a probability distribution 215. The probability distribution 215 represents a sensor-specific error model that encodes 2d velocity uncertainty as a covariance matrix $\Sigma_{v_x,v_z}$. The actual velocity of an object in cell 214 is indicated by velocity vector 211. A velocity measurement of the stereo camera is indicated as a measured radial velocity component 212 and a measured angular velocity component 213. The stereo camera-based scene flow analysis has a better velocity precision in angular direction than in radial direction so that the uncertainty in the radial direction is larger than in the angular direction. Accordingly, the probability distribution 215 is represented in FIG. 5a by an ellipse that is narrower in radial direction than in angular direction.

FIG. 5b schematically shows the uncertainty of a single velocity measurement as seen by a Doppler radar. The figure shows the spatial resolution uncertainty of the Doppler radar in the associated motion map. The motion map stores in cell 114 an x-z velocity vector and its respective uncertainty, indicated by a probability distribution 115. The probability distribution 115 represents a sensor-specific error model that encodes 2d velocity uncertainty as a covariance matrix $\Sigma_{v_x,v_z}$. The actual velocity of an object in cell 114 is indicated by velocity vector 111. A velocity measurement of the Doppler radar is indicated as a measured radial velocity component 112. The Doppler radar has a good velocity resolution in radial direction but the angular velocity component is typically not observable. Accordingly, the probability distribution 215 is represented in FIG. 5b by an ellipse that is narrow in radial direction but very large in angular direction.

FIG. 5c shows the reduced velocity measurement uncertainty in a fused motion map generated by fusing the aligned data of a Doppler radar and a stereo camera. The figure shows the uncertainty of the spatial resolution of the fused data in the fused motion map. The fused motion map stores in cell 314 an x-z velocity vector and its respective uncertainty, indicated by a probability distribution 315. The actual velocity of an object in cell 314 is indicated by velocity vector 311. A fused velocity measurement of the stereo camera is indicated as a radial velocity component 312 and an angular velocity component 313. As the camera and radar based measurements provide information on motion with complementary precision, the fused data has a good velocity resolution in radial direction and in axial direction. Accordingly, the probability distribution 315 of the fused measurement is represented in FIG. 5c by an ellipse that is narrow in radial direction and narrow in angular direction. The result is (under ideal conditions) a measurement with low uncertainty in both radial and angular direction.

Figure 6:
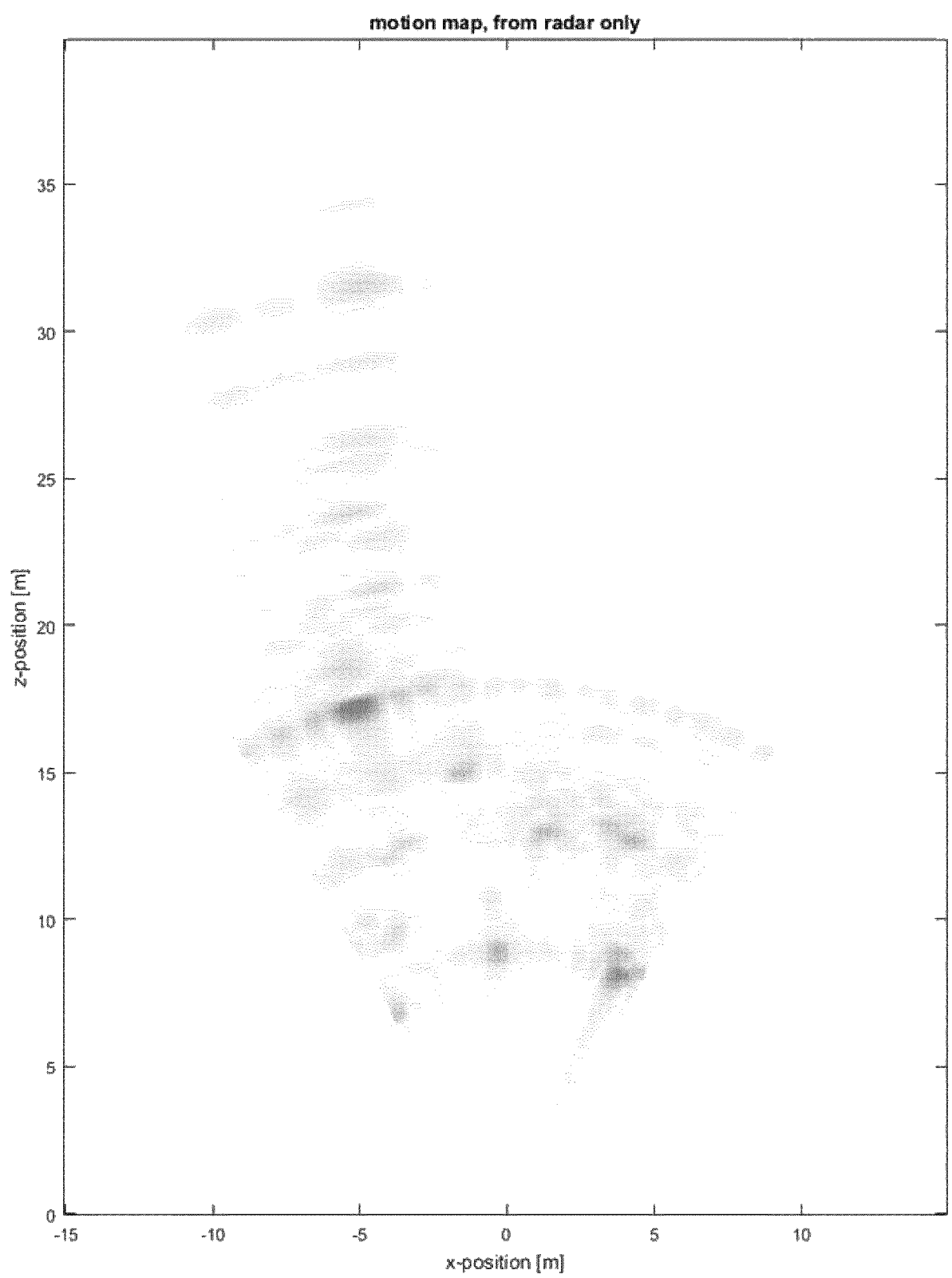
FIG. 6 shows an example of a motion map derived from Doppler radar measurements.

FIG. 6 shows an example of a motion map derived from Doppler radar measurements. In this visualization the brightness indicates velocity value. In alternative visualizations of a motion map, the information stored for each cell might be color-encoded as following: color saturation indicates the precision (unsaturated=zero precision), and brightness and hue indicate velocity value (black=zero speed) and direction (blue=up, yellow=down, magenta=left, green=right), respectively. The Doppler radar has a good velocity resolution in radial direction but the angular velocity component is not observable.

Figure 7:
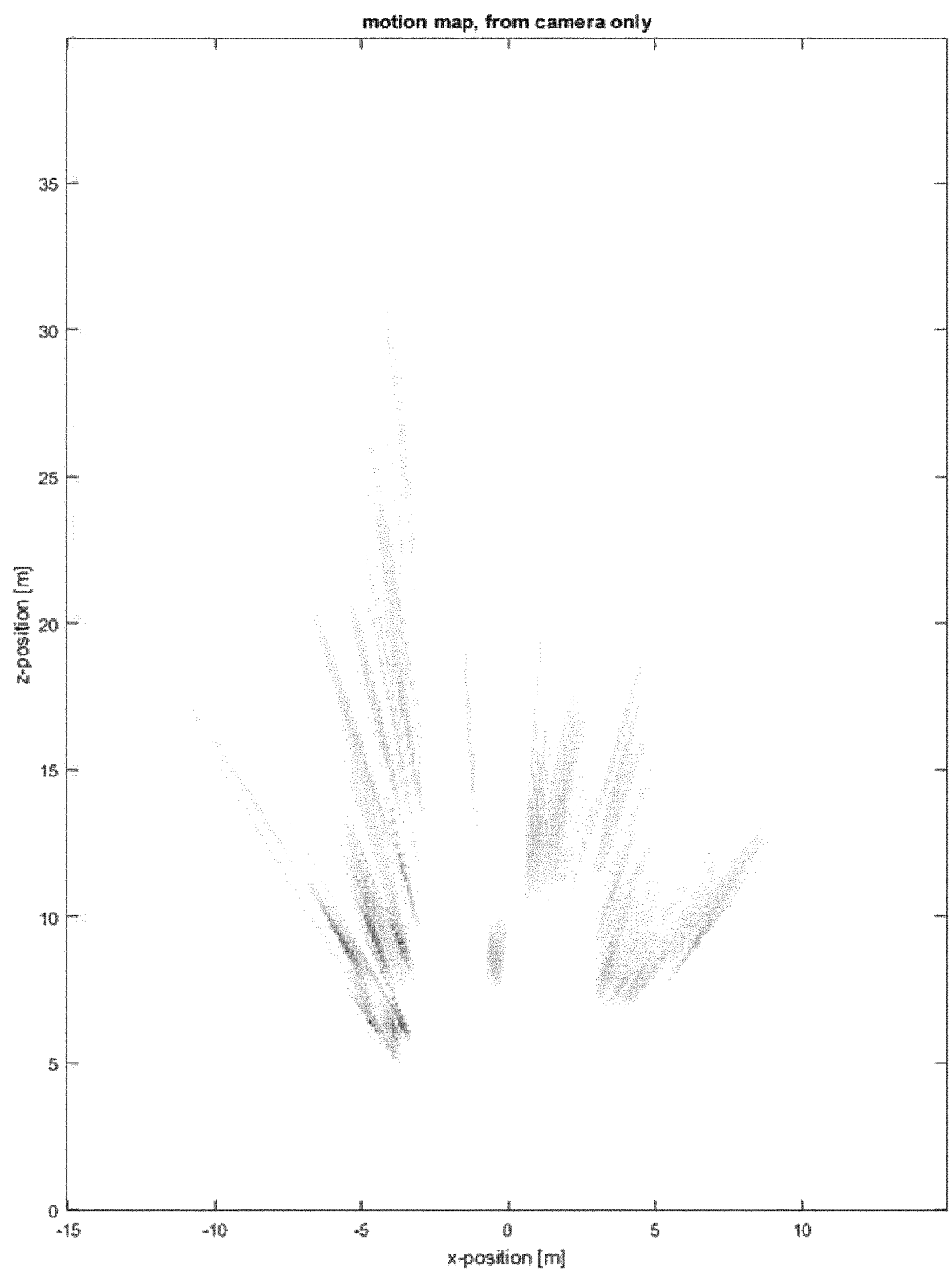
FIG. 7 shows an example of a motion map derived from scene flow measurements based on images captured by a stereo camera.

FIG. 7 shows an example of a motion map derived from scene flow measurements based on images captured by a stereo camera. The scene flow analysis has a better velocity resolution in angular direction than in radial direction, so that the uncertainty in the radial direction is larger than in the angular direction.

Figure 8:
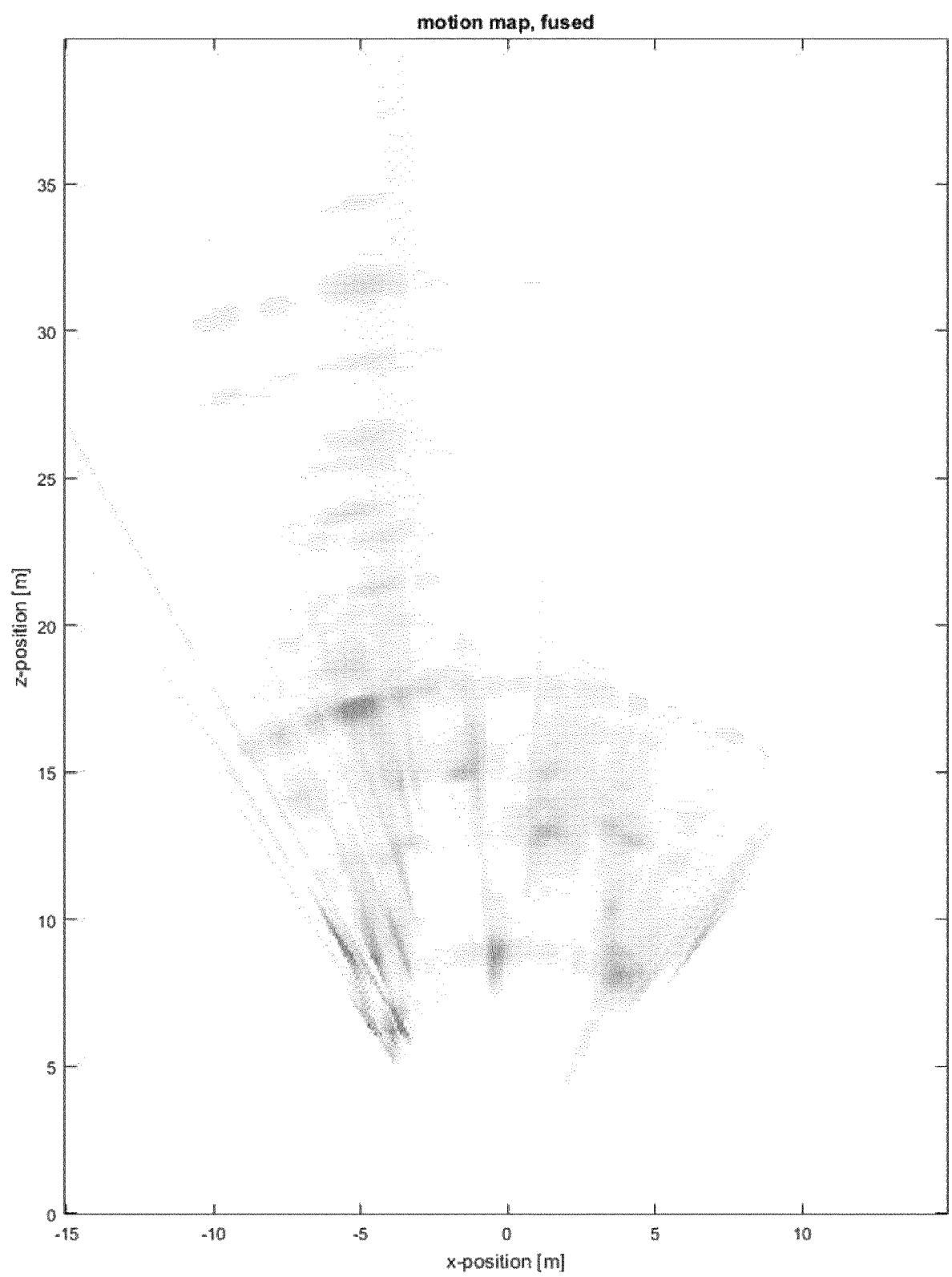
FIG. 8 shows an example of a fused motion map that combines the motion map derived from Doppler radar measurements with the motion map derived from scene flow measurements based on images captured by a stereo camera.

FIG. 8 shows an example of a fused motion map that combines the motion map of FIG. 6 obtained by a Doppler radar with the motion map of FIG. 7 obtained by scene flow analysis based on images captured by a stereo camera. The result is a measurement with low uncertainty in both radial and angular direction.

Motion Map Representation

For every grid cell we assume that the velocities v of contacts in this cell follow a normal distribution:

$$v = \begin{pmatrix} v_x \\ v_z \end{pmatrix} \sim N(\mu, \Sigma)$$

That is, for each cell of the motion map we have one speed estimate from scene flow(s) and Doppler radar (r) each, encoded as 2d normal distribution:

$$p(v|s)=N(\mu_s,\Sigma_s) \text{ and } p(v|r)=N(\mu_r,\Sigma_r)$$

It should be noted here that a scene flow speed estimate as described above may possibly be fused from several scene flow measurements, and that a Doppler radar estimate as described above may possibly be fused from several Doppler radar measurements.

"Auxiliary" Representation of Motion Map

According to an alternative representation which is, in implementation, more efficient for fusion (in the following called "auxiliary" representation) the parameters $\mu$, $\Sigma$ of the normal distribution are represented as follows:

$$P=\Sigma^{-1} \text{ and}$$

$$b=\Sigma^{-1}\mu=P\mu$$

Accordingly, the covariance matrix is represented by a precision $P:=\Sigma^{-1}\in R^{2\times 2}$ which is positively semidefinite and by $b:=\Sigma^{-1}\mu\in R^2$.

The conversion from the "auxiliary" representation to the normal representation is performed by:

$$\Sigma=P^{-1}, \mu=\Sigma b$$

Motion Map Fusion

Assuming two motion maps comprising information from sensors "a" and "b", given two distributions for v in the same cell:

$$p(v|a)=N(\mu_a,\Sigma_a) \text{ and } p(v|b)=N(\mu_b,\Sigma_b)$$

where $\mu_a$, $\mu_b$ are the respective mean values of the normal distribution N and $\Sigma_a$, $\Sigma_b$, are the respective covariance matrices of the normal distribution N.

These distributions are fused as $$p(v|a,b)=N(\mu_c,\Sigma_c) \propto p(v|a)p(v|b)=N(\mu_a,\Sigma_a)N(\mu_b,\Sigma_b)$$

with $$\Sigma_c=(\Sigma_a^{-1}+\Sigma_b^{-1})^{-1}$$

$$\mu_c\Sigma_c(\Sigma_a^{-1}\mu_a+\Sigma_b^{-1}\mu_b)$$

In the auxiliary representation, these distributions are represented by:

$$p_a,b_a, \text{ and } P_b,P_b$$

and using the auxiliary representation, the fusing reads as:

$$P_c=P_a+P_b \text{ and } b_c=b_a+b_b$$

Transformation of Doppler Radar Information to Motion Map

In the following, the process of aligning (103 in FIG. 1) the processed data (112 in FIG. 1) of the Doppler radar to obtain a motion map (104 in FIG. 1) of the Doppler radar data is explained in more detail.

For a given radar position (r, φ) in polar coordinates all considered radial velocities are provided with a weight $q(v_r)$ derived from the detection power. This information is encoded in a range-angle-speed cube and during the aligning process, for each range-angle-pair, the radial velocity $v_r$ is computed as q-weighted average along the speed-dimensions, and there is computed a precision estimate $\sigma_{V_r}^{-2}$ of this information as RMS of q along the speed information.

Then, for each x-z-cell of the motion map the radial velocity and precision from the range-angle-map are interpolated, and the speed information is encoded as a 2d normal distribution with mean $\mu_v$: speed $v_r$ in radial direction, speed 0 in angular direction and covariance $\Sigma_v$: eigenvalues: $\sigma_{V_r}^2$ in radial direction, $\approx\infty$ in angular direction.

For example, a motion model may be defined as follows:

$$e: =(\sin(\phi), \cos(\phi))$$

$$\mu_P:=e*r$$

$$\mu_V:=e*v_r$$

$$\Sigma_P^{-1}:=(e*e^\tau)*\sigma_{P_r}^{-2}+(I-e*e^\tau)*\sigma_{P_\phi}^{-2}$$

$$\Sigma_V^{-1}:=e*e^{\tau}*\sigma_{V_r}^{-2}$$

Here, $\sigma_{P_\phi}^{-2}$ and $\sigma_{P_r}^{-2}$ are parameters that define the precision of the position measurement and $\sigma_{V_r}^{-2}$ is a parameter that defines the precision of the velocity measurements and is derived from q as described above. These precisions may be defined by the model according to the capabilities of the sensor. Here, we assume for simplicity:

$$\sigma_{P_\phi}^{-2}:=1$$

$$\sigma_{P_r}^{-2}:=1$$

However, in practice, any other definition may be used that represents the capabilities of the sensor in a better way.

After that, a position (x, z) in the coordinate system of the motion map is determined and the mean value and covariance for the normal distribution that define the speed are calculated as follows:

$$\mu_p{}' = A\mu_P + b$$

$$\mu_v{}' = A\mu_V + b$$

$$\Sigma_p{}' = A\Sigma_P A^\tau$$

$$\Sigma_v{}' = A\Sigma_V A^\tau$$

Here, $A \in \mathbb{R}^{2 \times 2}$ is a predefined correction matrix and $b \in \mathbb{R}^2$ is a predefined correction vector that correct for the relative sensor alignment.

Next, $\mu_v$ and $\Sigma_v$ are converted to the auxiliary representation:

$$P_v = \Sigma_v^{-1} \text{ and } b_v = P_v \cdot \mu_v$$

Finally, for each cell i with center position $(x_i, z_i)$ in the motion map coordinate system, there is computed a weight $$w_i = N(x_i, z_i; \mu_p, \Sigma_{vp})$$

To iteratively accumulate information from multiple measurements for each cell a joint probability is computed by updating the velocity estimate $(P_i, b_i)$ in cell i with the new information $(w_i P_v, w_i b_v)$ which is the information derived from the currently considered measurement associated to cell i. This amounts to computing the joint probability as $$P_{i,new} = P_i + w_i P_v$$

$$b_{i,new} = b_i + w_i b_v$$

The information in cell i is then replaced by $(P_{i,new}, b_{i,new})$.

Here, $b_i$ and $P_i$ may be initialized as $(0,0)$ and $$\begin{pmatrix} 0 & 0 \\ 0 & 0 \end{pmatrix}.$$

Transformation of Scene Flow Information to Motion Map

In the following, the process of aligning (203 in FIG. 1) the processed data (212 in FIG. 1) of the scene flow (stereo camera) measurements to obtain a motion map (204 in FIG. 1) of the scene flow data is explained in more detail.

Given an image position $(p_x, p_y)$ in the image domain of the camera, measurements in this position comprise:

3d position $\mu_P := (\mu_{P_x}, \mu_{P_y}, \mu_{P_z})$
3d velocity $\mu_V := (\mu_{V_x}, \mu_{V_y}, \mu_{V_z})$ All this information is given in a camera coordinate system, e.g. the left camera.

Based on this information, irrelevant contacts (road surface, sufficient headroom) are removed from the data. Only measurements for example 0 to 3 m above road level are kept and a simple road model (pre-defined 3d plane) is used. To this end, the height of a point above the street is determined. If the point is on or below the street surface, then this measurement is ignored. If the point is above a safety headroom height, then the measurement is ignored. Otherwise, the measurement is maintained.

Then, 3d position and velocity measurements are projected to the 2d motion map using a simple road model. Also, alignment between camera and radar is corrected. A position $(x, z)$ in the coordinate system of the motion map is determined, e.g. by assuming a street plane and projecting the model to 2×3 matrix A, 2×1 vector b as $$\mu_x{}' = A \mu_P + b$$

$$\mu_v{}' = A \mu_V + b$$

Here, A, b also correct for the relative sensor alignment.

The measurements in combination with a 3d error model for position and speed (see section "Error Model for Scene Flow" below) also provide $\Sigma_P$ and $\Sigma_V$, both 3×3 covariance matrices, which represent sensor-specific precision. For example, each measurement is encoded using a normal distribution. The mean $\mu$ is given by the measurement. The covariance $\Sigma$ is given by the error model. $\Sigma_P$ and $\Sigma_V$, both 3×3 covariance matrices, represent the sensor-specific precision:

$$\Sigma_x{}' = A\Sigma_P A^\tau$$

$$\Sigma_v{}' = A\Sigma_V A^\tau$$

Then $\mu_v$ and $\Sigma_v$ are converted to the auxiliary representation:

$$P_v = \Sigma_v^{-1} \text{ and } b_v = P_v \cdot \mu_v$$

Finally, for each cell i with center position $(x_i, z_i)$ in the motion map coordinate system, it is computed a weight $$w_i = N(x_i, z_i; \mu_x, \Sigma_x)$$

To iteratively accumulate information from multiple measurements for each cell a joint probability is computed by updating the velocity estimate $(P_i, b_i)$ in cell i with the new information $(w_i P_v, w_i b_v)$ which is the information derived from the currently considered measurement associated to cell i. This amounts to computing the joint probability as $$P_{i,new} = P_i + w_i P_v$$

$$b_{i,new} = b_i + w_i b_v$$

The information in cell i is then replaced by $(P_{i,new}, b_{i,new})$. Here, $b_i$ and $P_i$ are initialized as $(0,0)$ and $$\begin{pmatrix} 0 & 0 \\ 0 & 0 \end{pmatrix}.$$

Error Model for Scene Flow

For the 3d error model used in the transformation of scene flow information to a motion map as described above, the computation of normal distributions for 3d position $(\mu_p, \Sigma_p)$ and 3d velocity $(\mu_V, \Sigma_V)$ assumptions is as follows:

Information is recorded from four camera views: An image is obtained from a first (e.g. left) camera view $C_L$ and an image is obtained from a second (e.g. right) camera view $C_R$ at their position at a time t. Still further, an image is obtained from a first camera view $C'_L$ and from a second camera view $C'_R$ at their position at a time t+T, where T is the time difference between the camera views.

Then, the data from camera pairs $(C_L, C_R)$ and $(C'_L, C'_R)$ is calibrated and rectified such that the baselines b (between $C_L$ and $C_R$) and b' (between $C'_L$ and $C'_R$) are known, and the intrinsic calibration K (valid for $C_L$ and $C_R$) and K' (valid for $C'_L$ and $C'_R$) are known.

Given an image position $(p_x, p_y)$ in the image domain of the camera and measurements in this position, a 3d position $\mu_P := (\mu_{P_x}, \mu_{P_y}, \mu_{P_z})$ and a 3d velocity $\mu_V := (\mu_{V_x}, \mu_{V_y}, \mu_{V_z})$ are obtained for every image position.

From the measurements, per pixel at position $(p_x, p_y)$ in camera $C_L$ the following information is given:
- disparity D between a point $(p_x, p_y)$ in $C_L$ and corresponding position $(p_x+D, p_y)$ in $C_R$
- displacement $(u_x, u_y)$ between a point $(p_x, p_y)$ in $C_L$ and the corresponding position $(p_x+u_x, p_y+u_y)$ in $C'_L$
- disparity D' between a point $(p_x+u_x, p_y+u_y)$ in $C'_L$ and the corresponding point $(p_x+u_x+D', p_y+u_y)$ in $C'_R$ Still further, covariance estimates $\Sigma_m$ and $\Sigma'_m$ for measurement errors for $(D, p_x, p_y)$ and $(D', p_x+u_x, p_y+u_y)$ are determined, e.g. from experimental measurements.

Based on this information the following computations are performed:

There is computed (using $f$ as defined below) and returned a distribution for 3d position P, given by $$(\mu_P, \Sigma_P) := f(D, p_x, p_y, K, b, \Sigma_m),$$

where $(\mu, \Sigma) = f(D, p_x, p_y, K, b, \Sigma_{D,p_x,p_y})$

Still further, there is computed a distribution for P', given by $$(\mu_{P'}, \Sigma_{P'}) := f(D', p_x u_x, p_y u_y, K', b', \Sigma'^m).$$

And there is computed a distribution of the 3d velocity $V = T^{-1}(P' - P) \sim N(\mu_V, \Sigma_V)$, given by (linear combination of random variables):

$$\mu_V := T^{-1}(\mu_{P'} - \mu_P)$$

$$\Sigma_V = T^{-2}(\Sigma_{P'} + \Sigma_P)$$

The previous computations utilize an auxiliary function $f$ $(D, p_x, p_y, K, b, \Sigma_{D,p_x,p_y})$ which is computed as follows.
Given: the pixel position $(p_x, p_y)$ in the first camera,
the disparity D between a point $(p_x, p_y)$ in the first camera and corresponding position $(p_x+D, p_y)$ in a second camera,
3×3 matrix K, describing the intrinsic camera parameters of both the first and second camera,
baseline b describing the distance between the origins of the coordinate systems of the first and second camera, and
3×3 covariance matrix $\Sigma_{D,p_x,p_y}$ describing an estimate of the errors in D, $p_x$ and $P_y$,
there is computed the parameters of an approximate normal distribution of a point $\hat{X}$ reconstructed via triangulation between the first and second camera.

The point $\hat{X}$ is reconstructed in the coordinate system of the first camera, such that $\hat{X} \sim N(\mu, \Sigma)$, with parameters computed as follows:

We introduce an auxiliary function:

$$X(d, x, y) \approx (b\ K_{1,1}) d^{-1} K^{-1} \begin{pmatrix} x \\ y \\ 1 \end{pmatrix}$$

(stereo reconstruction via triangulation)

Then assuming $(D, p_x, p_y)$ to be normally distributed with $\Sigma_{D,p_x,p_y}$ we get (error propagation):

$\mu := X(D, p_x, p_y)$ and $\Sigma := J_X(D, p_x, p_y) \Sigma_{D,x,y} (J_X(D, p_x, p_y))^\tau$ where $J_X(D, p_x, p_y)$ is the 3×3 Jacobian matrix of $X(d, x, y)$ evaluated at position $(D, p_x, p_y)$.

Here, the Jacobian matrix $J_X(d, x, y)$ is given by (first order component-wise derivatives)

$$J_X(d, x, y) = (b\ K_{1,1}) K^{-1} \left[ \begin{pmatrix} x \\ y \\ 1 \end{pmatrix} (-d^{-2}) \quad \begin{pmatrix} 1 \\ 0 \\ 0 \end{pmatrix} d^{-1} \quad \begin{pmatrix} 0 \\ 1 \\ 0 \end{pmatrix} d^{-1} \right]$$

The thus obtained parameters $\mu$, $\Sigma$ returned by f can now be used in the transformation of scene flow information to a motion map as described above.

Implementation

The technology according to the embodiments of the present disclosure is applicable to various products. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 9:
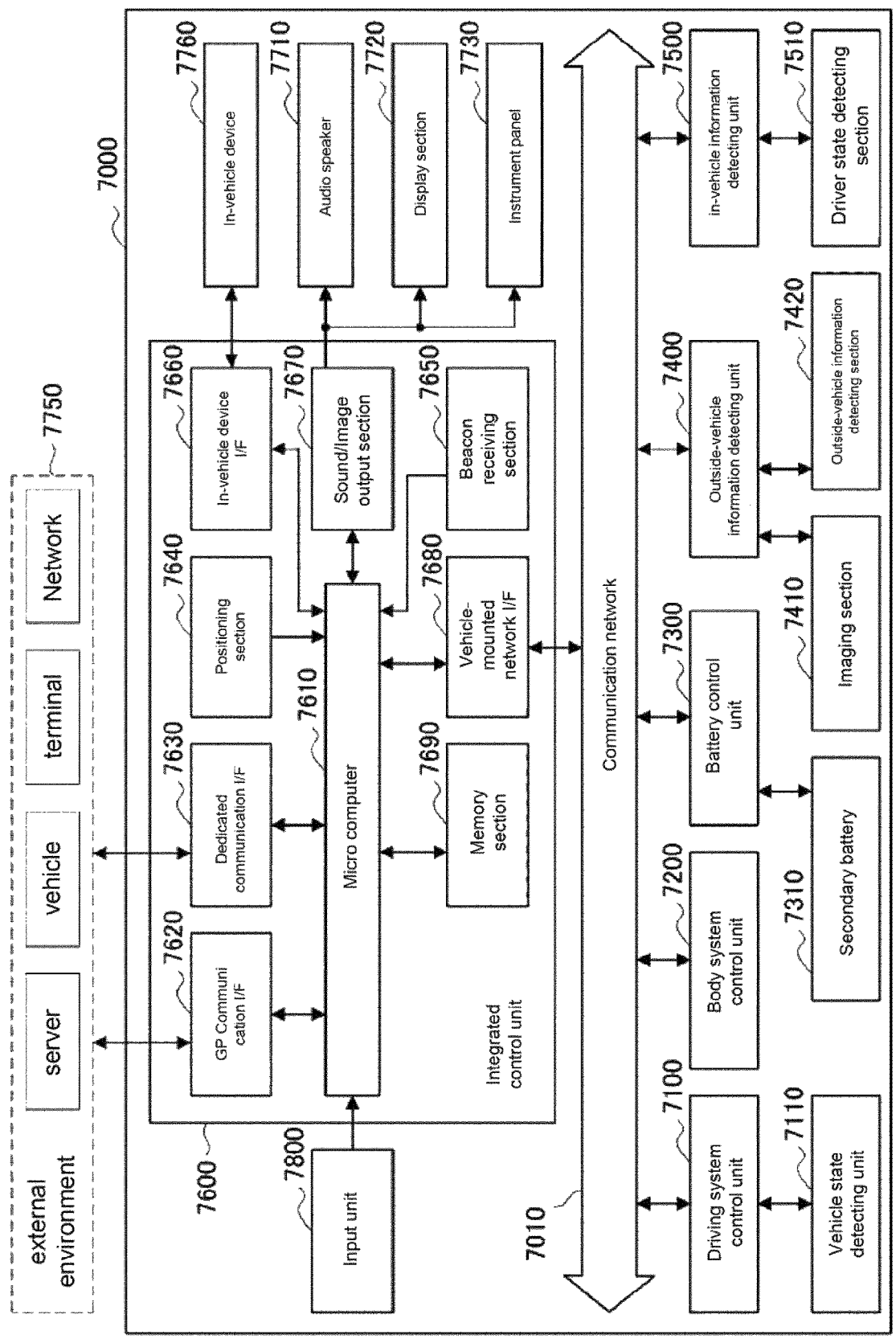
FIG. 9 is a block diagram depicting an example of schematic configuration of a vehicle control system.

FIG. 9 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 9, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 9 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting fog, a sunshine sensor detecting a degree of sunshine, and a snow sensor detecting snowfall. The peripheral information detecting sensor may be at least one of an ultrasonic sensor, a radar device, and a LiDAR device (Light Detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 10:
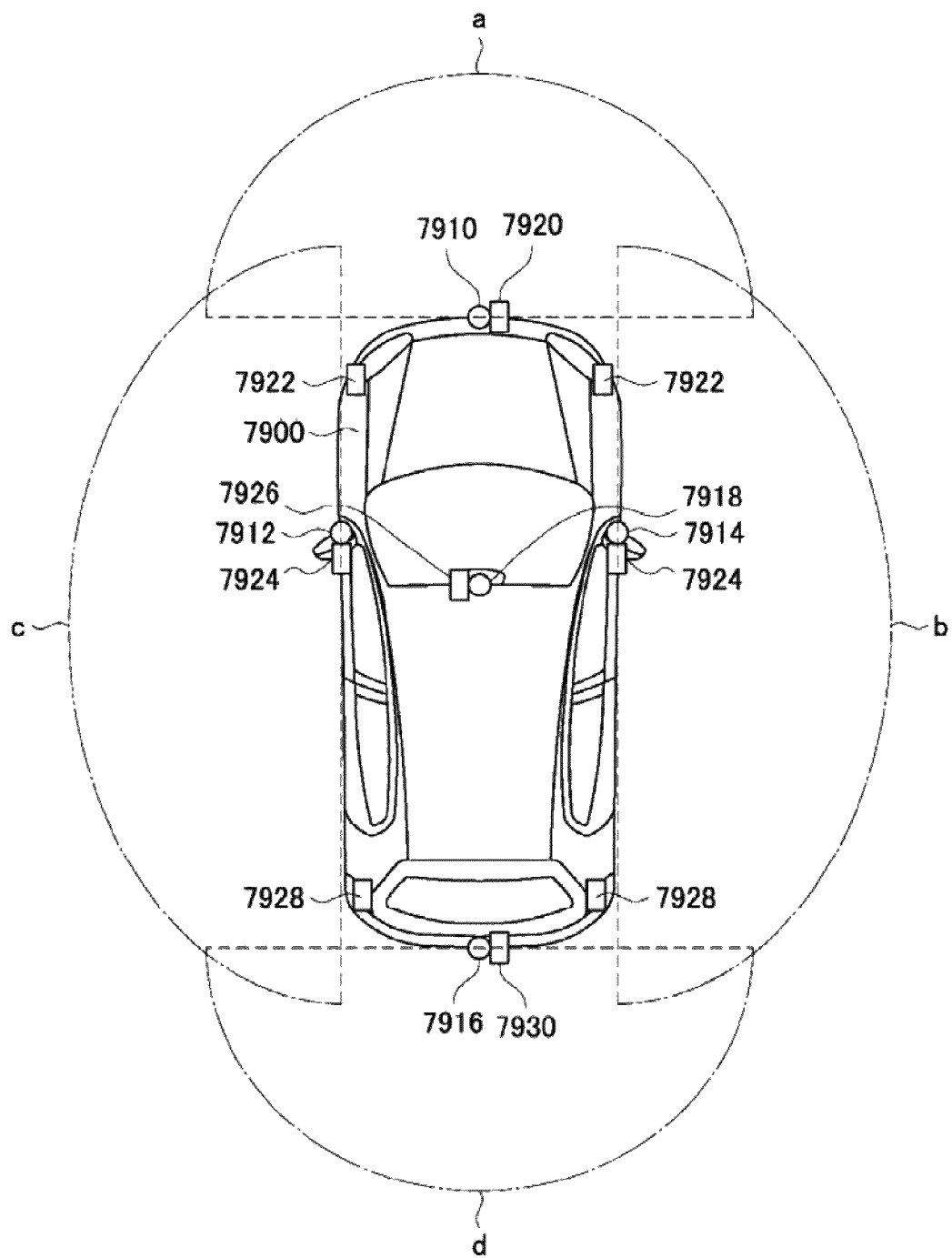
FIG. 10 is a diagram of assistance in explaining an example of installation positions of an outside-vehicle information detecting section and an imaging section.

FIG. 10 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided at the front nose and the imaging section 7918 provided at the upper portion of the windshield within the interior of the vehicle obtain mainly an image of the front of the vehicle 7900. The imaging sections 7912 and 7914 provided at the sideview mirrors obtain mainly an image of the sides of the vehicle 7900. The imaging section 7916 provided at the rear bumper or the back door obtains mainly an image of the rear of the vehicle 7900. The imaging section 7918 provided at the upper portion of the windshield within the interior of the vehicle is used mainly to detect a preceding vehicle, a pedestrian, an obstacle, a signal, a traffic sign, a lane, or the like.

Incidentally, FIG. 10 depicts an example of photographing ranges of the respective imaging sections 7910, 7912, 7914, and 7916. An imaging range a represents the imaging range of the imaging section 7910 provided at the front nose. Imaging ranges b and c respectively represent the imaging ranges of the imaging sections 7912 and 7914 provided at the sideview mirrors. An imaging range d represents the imaging range of the imaging section 7916 provided at the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided at the front, rear, sides, and corners of the vehicle 7900 and the upper portion of the windshield within the interior of the vehicle may be, for example, an ultrasonic sensor or a radar device. The outside-vehicle vehicle information detecting sections 7920, 7926, and 7930 provided at the front nose of the vehicle 7900, the rear bumper, the back door of the vehicle 7900, and the upper portion of the windshield within the interior of the vehicle may be a LiDAR device, for example. These outside-vehicle information detecting sections 7920 to 7930 are used mainly to detect a preceding vehicle, a pedestrian, an obstacle, or the like.

Returning to FIG. 9, the description will be continued. The outside-vehicle information detecting unit 7400 causes the imaging section 7410 to produce an image of the outside of the vehicle, and receives produced image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing rain, fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information on the driver, a microphone that collects sound within the interior of the vehicle, or the like. The biosensor is, for example, disposed in a seat surface, the steering wheel, or the like, and detects biological information on an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such as, for example, wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal Handy-phone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which causes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or acoustically notifying an occupant of the vehicle or the outside of the vehicle. In the example of FIG. 9, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and acoustically outputs the analog signal.

Incidentally, at least two control units connected to each other via the communication network 7010 in the example depicted in FIG. 9 may be integrated into one control unit. Alternatively, each individual control unit may include a plurality of control units. Further, the vehicle control system 7000 may include another control unit not depicted in the figures. In addition, part of or all the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions described in this disclosure can be implemented in integrated control unit 7600, or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In addition, at least part of the constituent elements of the integrated control unit 7600 described with reference to FIG. 9 may be implemented in a module (for example, an integrated circuit module formed with a single die) for the integrated control unit 7600 depicted in FIG. 9. Alternatively, the integrated control unit 7600 described with reference to FIG. 9 may be implemented by a plurality of control units of a vehicle control system as depicted in FIG. 9.

* * *

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be noted that the embodiments describe methods with an exemplary order of method steps. The specific order of method steps is, however, given for illustrative purposes only and should not be construed as binding.

It should also be noted that the division of the control or circuitry of FIG. 9 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus comprising circuitry configured to transfer motion information obtained from a plurality of sensors of different or similar type to a common representation.

(2) The apparatus of (1) wherein the common representation is a motion map.

(3) The apparatus of anyone of (1) or (2) wherein data association is given by the assignment of data to cells of the motion map.

(4) The apparatus of anyone of (1) to (3) wherein the circuitry is configured to fuse the data of a Doppler radar and a stereo camera into a common representation.

(5) The apparatus of anyone of (1) to (4) wherein the circuitry is configured to transfer to the common representation motion information obtained from a Doppler radar.

(6) The apparatus of (4) or (5) wherein the motion information obtained from the Doppler radar comprises polar coordinates of a cell in the polar coordinate space and angular and radial components of the velocity attributed to the cell.

(7) The apparatus of anyone of (1) to (6) wherein the circuitry is configured to transfer to the common representation motion information obtained by scene flow estimation on images captured by a stereo camera.

(8) The apparatus of (4) or (7) wherein the motion information obtained from scene flow estimation comprises image positions, disparity data and displacement data.

(9) The apparatus of anyone of (1) to (6) wherein the circuitry is configured to reconstruct position and velocity from sensor data to obtain a motion map of the sensor data.

(10) The apparatus of anyone of (1) to (9) wherein the circuitry is configured to apply an error model for motion on the processed data to obtain a motion map of the sensor data.

(11) The apparatus of anyone of (1) to (10) wherein the circuitry is configured to represent the motion map represented by $\mu_{v_x,v_z}$, $\Sigma_{v_x,v_z}$; x, z where x, z are 2d Cartesian coordinates in the motion map, $\mu_{v_x,v_z}$ are the mean values of a normal distribution describing a velocity estimate $(v_x, v_z)$, and $\Sigma_{v_x,v_z}$ is the covariance matrix that represents the information on the motion measurement obtained from a sensor-specific error model.

(12) The apparatus of anyone of (1) to (11) wherein the circuitry is configured to fuse sensor data cell-wise by determining for each cell a joint probability for the velocity.

(13) The apparatus of anyone of (1) to (12) wherein the circuitry is configured to assume, for every grid cell of a motion map, that the velocity v of contacts in this cell follow a normal distribution.

(14) The apparatus of anyone of (1) to (13) wherein the circuitry is configured to transform parameters of an error model into an auxiliary representation P, b according to:

$$P=\Sigma^{-1} \text{ and}$$

$$b=\Sigma^{-1}\mu=P\mu$$

where $\mu$ is a mean value and $\Sigma$ is a covariance matrix.

(15) The apparatus of anyone of (1) to (14) wherein the circuitry is configured to fuse information from sensors "a" and "b" as $$p(v|a,b)=N(\mu_c,\Sigma_c)\propto p(v|a)p(v|b)=N(\mu_a,\Sigma_a)N(\mu_b,\Sigma_b)$$

with $$p(v|a)=N(\mu_a,\Sigma_a) \text{ and } p(v|b)=N(\mu_b,\Sigma_b)$$

being two given distributions for v in the same cell and where $\mu_a$, $\mu_b$ are the respective mean values of the normal distribution N and $\Sigma_a$, $\Sigma_b$ are the respective covariance matrices of the normal distribution N.

(16) Vehicle control system comprising the apparatus of anyone of (1) to (15).

(17) Vehicle control system of (16) wherein the vehicle is a motor vehicle, an electric vehicle, a hybrid vehicle, a robot, an autonomous robot, a drone product, or an autonomous drone product.

(18) Advanced driver assistance system comprising the apparatus of anyone of (1) to (15).

(19) A method comprising transferring motion information obtained from a plurality of sensors of different or similar type to a common representation.

(20) A computer program comprising instructions which when carried out on a processor cause the processor to transfer motion information obtained from a plurality of sensors of different or similar type to a common representation.

(21) A tangible and readable storage medium storing a computer program comprising instructions which when carried out on a processor cause the processor to transfer motion information obtained from a plurality of sensors of different or similar type to a common representation.

The invention claimed is:

1. An apparatus comprising circuitry configured to:
receive motion information regarding a scene obtained from a plurality of motion sensors, the plurality of motion sensors including a first n notion sensor and a second motion sensor, the first and second motion sensors being at least two of a first type of motion sensor or at least one of the first type of motion sensor and at least one of a second type of motion sensor, the second type of motion sensor detecting a different parameter of the scene than the first type of motion sensor;

transform parameters of an error model into an auxiliary representation P, b according to:

$P = \Sigma^{-1}$ and $b = \Sigma^{-1}\mu = P\mu$ where $\mu$ as a mean value and $\Sigma$ is a covariance matrix;
apply the error model to data from the first motion sensor to obtain a first motion map and to data from the second motion sensor to obtain a second motion map; and
fuse the first motion map and the second motion map into a fused motion map.

2. The apparatus of claim 1, wherein the circuitry is further configured to align data of the first motion sensor and align data of the second motion sensor and assign aligned data to cells of the fused motion map.

3. The apparatus of claim 1 wherein the the first motion sensor is a Doppler radar and the second motion sensor is a stereo camera.

4. The apparatus of claim 3, wherein motion information obtained from the Doppler radar comprises polar coordinates of a cell in the polar coordinate space and angular and radial components of the velocity attributed to the cell.

5. The apparatus of claim 1, wherein the at least one of the first and second motion sensors is a Doppler radar.

6. The apparatus of claim 1, wherein at least one of the first and second motion sensors is a stereo camera and the circuitry is configured to obtain scene flow estimation on images captured by the stereo camera.

7. The apparatus of claim 6, wherein motion information obtained from scene flow estimation comprises image positions, disparity data and displacement data.

8. The apparatus of claim 1, wherein the circuitry is configured to reconstruct position and velocity from sensor data to obtain first and second motion maps.

9. The apparatus of claim 1 wherein the circuitry is configured to represent the motion map represented by $\mu_{v_x,v_z}$, $\Sigma_{v_x,v_z}$; x, z are 2d Cartesian coordinates in the motion map, are the mean values of a normal distribution describing a velocity estimate $(v_x, v_z)$, and $\Sigma_{v_x,v_z}$ is the covariance matrix that represents the information on the motion measurement obtained from a sensor-specific error model.

10. The apparatus of claim 1, wherein the circuitry is configured to fuse first and second motion mans cell-wise by determining for each cell a joint probability for the velocity.

11. The apparatus of claim 1 wherein the circuitry is configured to assume, for every grid cell of the first and second motion maps, that the velocity v of contacts in this cell follow a normal distribution.

12. The apparatus of claim 1, wherein the circuitry is configured to fuse information from the first motion map of the first motion sensor "a" and the second motion map of the second motion sensor "b" as $p(v|a,b) = N(\mu_c, \Sigma_c) \propto p(v|a)p(v|b) = N(\mu_a, \Sigma_a)N(\mu_b, \Sigma_b)$ with $p(v|a) = N(\mu_a, \Sigma_a)$ and $p(v|b) = N(\mu_b, \Sigma_b)$ being two given distributions for v in the same cell and where $\mu_a$, $\mu_b$ are the respective mean values of the normal distribution and $\Sigma_a$, $\Sigma_b$ are the respective covariance matrices of the normal distribution N.

13. Vehicle control system comprising the apparatus of claim 1.

14. Vehicle control system of claim 13 wherein the vehicle is a motor vehicle, an electric vehicle, a hybrid vehicle, a robot, an autonomous robot, a drone product, or an autonomous drone product.

15. Advanced driver assistance system comprising the apparatus of claim 1.

16. A method comprising:
receiving motion information regarding a scene obtained from a plurality of motion sensors, the plurality of motion sensors including a first motion sensor and a second motion sensor, the first and second motion sensors being at least two of a first type of motion sensor or at least one of the first type of motion sensor and at least one of a second type of motion sensor, the second type of motion sensor detecting a different parameter of the scene than the first type of motion sensor; and
fusing information from the first motion sensor "a" and the second motion sensor "b" as $p(v|a,b) = N(\mu_c, \Sigma_c) \propto p(v|a)p(v|b) = N(\mu_a, \Sigma_a)N(\mu_b, \Sigma_b)$ with $p(v|a) = N(\mu_a, \Sigma_a)$ and $p(v|b) = N(\mu_b, \Sigma_b)$ being two given distributions for v in the same cell and where $\mu_a$, $\mu_b$ are the respective mean values of the normal distribution and $\Sigma_a$, $\Sigma_b$ are the respective covariance matrices of the normal distribution N into a fused motion map.

17. A non-transitory computer readable storage device having computer readable instructions which, when carried out on a processor, cause the processor to:
receive motion information regarding a scene obtained from a plurality of motion sensors, the plurality of motion sensors including a first motion sensor and a second motion sensor, the first and second motion sensors being at least two of a first type of motion sensor or at least one of the first type of motion sensor and at least one of a second type of motion sensor, the second type of motion sensor detecting a different parameter of the scene than the first type of motion sensor; and
fuse information from the first emotion sensor "a" and the second motion sensor "b" as $p(v|a,b) = N(\mu_c, \Sigma_c) \propto p(v|a)p(v|b) = N(\mu_a, \Sigma_a)N(\mu_b, \Sigma_b)$ with $p(v|a) = N(\mu_a, \Sigma_a)$ and $p(v|b) = N(\mu_b, \Sigma_b)$ being two given distributions for v in the same cell and where $\mu_a$, $\mu_b$ are the respective mean values of the normal distribution and $\Sigma_a$, $\Sigma_b$ are the respective covariance matrices of the normal distribution N into a fused motion map.

18. Vehicle control system comprising the non-transitory computer readable storage device of claim 17.

* * * * *